United States Patent [19]

Guerette

[11] Patent Number: 4,655,374
[45] Date of Patent: Apr. 7, 1987

[54] DISPENSING APPARATUS VALVE

[75] Inventor: Alvin Guerette, Laval, Canada

[73] Assignee: Controle BVL LTEE, Quebec, Canada

[21] Appl. No.: 713,670

[22] Filed: Mar. 19, 1985

[51] Int. Cl.⁴ ............................................. B22D 37/00
[52] U.S. Cl. ..................................... 222/504; 222/518;
251/129.21
[58] Field of Search .......................... 222/71, 16, 21, 14,
222/20, 640, 641, 644, 559, 504, 518, 509, 505,
638; 251/129.15, 129.21, 129.01; 137/600

[56] References Cited

U.S. PATENT DOCUMENTS

| | | | |
|---|---|---|---|
| 2,607,368 | 8/1952 | Mayer | 251/129.21 |
| 2,682,984 | 7/1954 | Melikian et al. | 222/640 |
| 3,004,670 | 10/1961 | Zonker | 251/129.21 |
| 3,007,672 | 11/1961 | Tischler | 251/129.21 |
| 3,183,932 | 5/1965 | Karpus, Jr. | 251/129.21 |
| 3,411,745 | 11/1968 | Austin, Jr. et al. | 251/129.15 |
| 3,456,839 | 7/1969 | Glisenti | 222/638 |
| 4,226,343 | 10/1980 | Fling | 222/504 |
| 4,271,992 | 6/1981 | Becker | 222/509 |

FOREIGN PATENT DOCUMENTS 857776 1/1961 United Kingdom ................ 137/600

Primary Examiner—Joseph J. Rolla
Assistant Examiner—Kenneth Noland
Attorney, Agent, or Firm—James W. Hellwege

[57] ABSTRACT

A liquid control valve for use with effervescent liquids having a valve seat, cylinder, and plunger wherein the plunger is moveable in the cylinder from a closed position where the plunger is seated against the valve seat to an open position in which the plunger is removed from the valve seat; the plunger having a series of openings through or along the length of the plunger whereby the effervescent liquid will flow through or by the plunger when the plunger is removed from the valve seat; means to move said plunger away from the valve seat and return said plunger to the valve seat in response to a manual or automated command.

3 Claims, 2 Drawing Figures

DISPENSING APPARATUS VALVE

This invention relates to a liquid control valve for use in a dispensing apparatus. The valve is particularly suited for use in apparatus for the dispensing of effervescent liquids, and more particularly for the dispensing of beer.

In dispensing of effervescent liquids such as beer the control of foam is particularly important for several reasons. Too much foam will interfere with the number of glasses or pitchers which may be filled within a particular unit of time and will result in loss of product through overflow. Too little foam will result in a product which appears flat and less palatable. One of the purposes of this invention is to provide a valve which will avoid overfoaming.

Valves used in controlling the flow of effervescent liquids and more particularly beer must be cleaned regularly to comply with health requirements and to maintain the valves in satisfactory operating condition. Many valves in use in beer dispensing apparatus are sufficiently complex that the valves require trained technicians to clean and service the valves. One of the features of the valve of this invention is that the valve can be cleaned and serviced by barmen rather than by trained technicians.

Another feature of the current invention is that the valve can be used in conjunction with a conventional manual tap with minor changes to an interior portion of the manual tap.

One embodiment of the invention is a liquid control valve for an effervescent liquid comprising a valve seat, a cylinder, a plunger in said cylinder seated against said valve seat when said valve is closed, said plunger including openings for effervescent liquid to flow by or through the plunger when the valve is open and activating means to move said plunger away from or to said valve seat. In another embodiment the plunger has a hollow cylindrical body and a integral conical front end adapted to sit in said valve seat when the valve is closed, a series of inclined openings in said conical front end discharge said effervescent liquid toward the outer walls when the valve is open. In a further embodiment of the invention the valve seat has an inclined face adapted to receive the plunger when the valve is closed, the opposite side of said valve seat having an expanding conical opening. In another embodiment the invention relates to a liquid control valve for an effervescent liquid comprising a cylinder, a plunger in said cylinder, said plunger including openings for effervescent liquid to flow by or through said plunger, means for preventing the flow of effervescent liquid through said plunger.

The invention also relates to a tap for an effervescent liquid comprising a handle and means for controlling the flow of liquid through said tap, said handle activates the means for controlling the flow of liquid through said tap, said means for controlling the flow of liquid through said tap comprising a cylinder, a plunger in said cylinder, said plunger including openings for effervescent liquid to flow by or through said plunger, means for preventing the flow of effervescent liquid through said plunger. In another embodiment of the tap the plunger has a hollow cylindrical body and an integral conical front end, a series of inclined openings in said conical front end discharge said effervescent liquid toward the outer walls when said liquid is flow. In a further embodiment of the tap, the valve seat controls the flow of effervescent liquid, the valve seat has an inclined face adapted to receive the plunger when the valve is closed, the opposite side of said valve seat having an expanding conical opening. In a still further embodiment of the tap, the handle is connected to a liquid control stem which directs the effervescent liquid discharging from the valve seat towards the outer walls of the tap.

In the drawings

Figure 1:
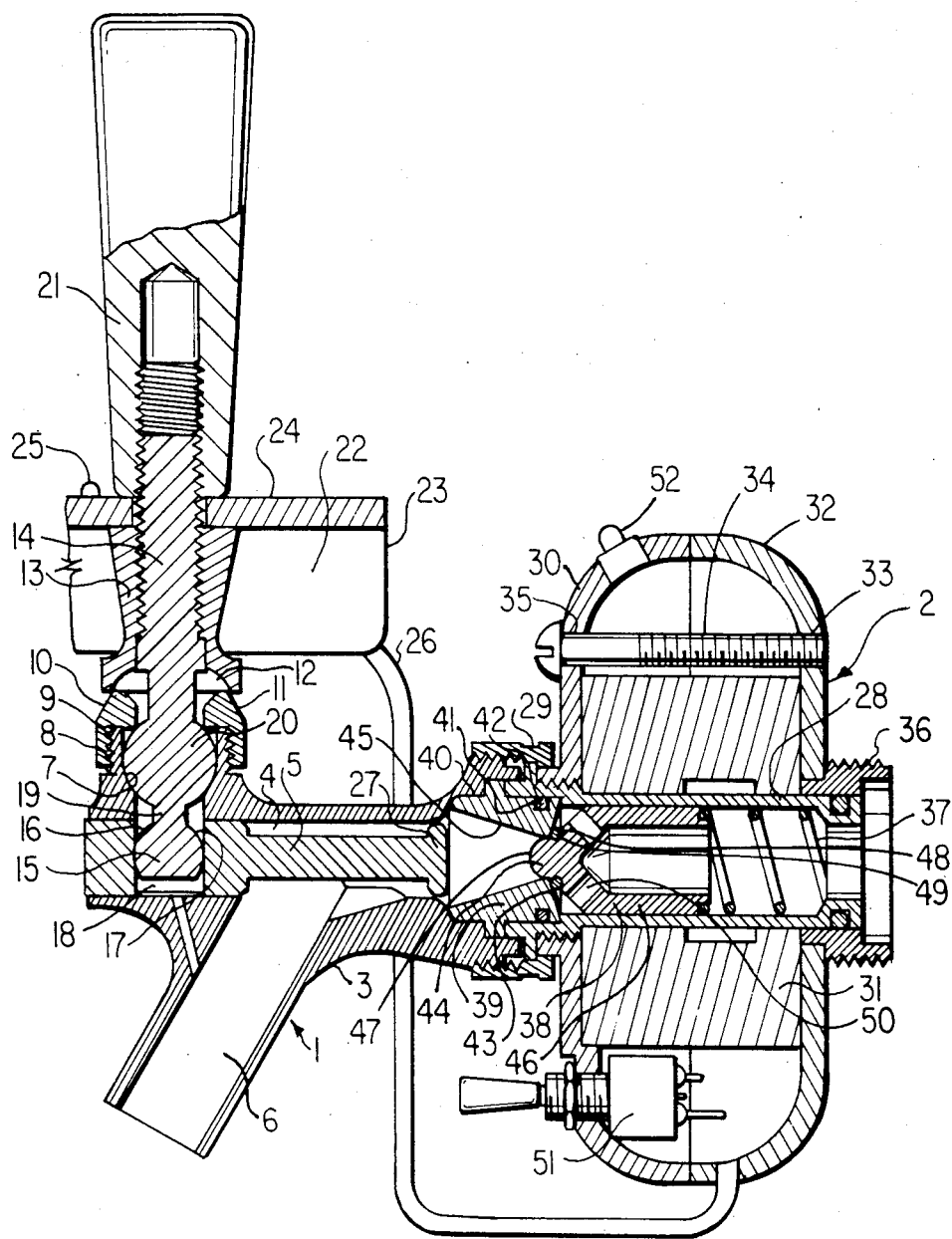
FIG. 1 is a cross-sectional view through the tap and valve showing the valve in closed position.

Referring to FIG. 1, there is shown a tap 1 attached to a flow through displacement valve 2. The tap 1 is comprised of tap body 3 having a horizontal cylindrical opening 4 adapted to receive a slidable liquid control stem 5. The tap body 3 includes a forwardly inclined cylindrical opening which comprises spout 6. The forward upper part of tap body 3 features an interior ball seat 7 and exterior threads 8. The exterior threads 8 are adapted to receive the interior threads 9 of ball socket cover 10. Ball socket cover 10 has an outer convex surface 11 for slidable engagement with convex surface 12 of low exterior handle base 13. Handle shaft 14 contains a flat bottom portion 15 having curved forward and rear surfaces 16 and 17 receivable in an aperature 18 in liquid control stem 5. Flat bottom portion 15 of handle shaft 14 extends upwardly through a short cylindrical section 19 into a ball shaped section 20. The ball shaped section 20 is adapted to be received between ball seat 7 and ball socket cover 10 for rotable movement relative thereto. The upper portion of handle shaft 14 is threaded to receive lower exterior handle base 13 and handle 21 which is also threadably mounted on the top portion of handle shaft 14. A mercury or magnetic switch 22 is mounted on handle shaft 14 between lower exterior handle base 13 and handle 21. The mercury or magnetic switch 22 is mounted in a vaporproof housing 23 having a generally flat top 24 including an indicator light 25 which lights when the handle 21 is pulled forward and the mercury or magnetic switch 22 is activated. The mercury or magnetic switch 22 is connected by a casing 26 enclosing wires to a control box which in turn activates the valve 2 to deliver a predetermined portion.

The liquid control stem 5 is slidably mounted in horizontal cylindrical opening 4. The end of the liquid control stem 5 having aperature 18 to receive the flat bottom portion 15 of handle shaft 14 is of substantially the same diameter as the horizontal cylindrical opening 4 for substantially two-fifths of its length. The remaining three-fifths or so of liquid control stem 5 is substantially one-half the diameter of horizontal cylindrical opening 4 and features short enlarged head 27.

The valve 2 is comprised of a cylinder 28. The cylinder 28 has three different interior diameters. The first interior diameter of cylinder 28, that portion of cylinder 28 which is adapted to be fastened to tap 1 has the largest diameter. The long middle portion of cylinder 28 has a slightly smaller diameter than the first mentioned diameter. Finally, the end of cylinder 28 has a yet smaller diameter than the two previously mentioned diameters of cylinder 28. The front part of cylinder 28 includes a rotatable threaded closure 29 which is adapted to receive the threaded end of tap body 3 to maintain the tap 1 and valve 2 in secure engagement when the threaded closure 29 is fastened tightly about the threaded end of the tap body 3. The outside of cylinder 28 is adapted to receive the front half case 30 which may be threaded or friction fit to cylinder 28 immediately adjacent and behind rotable threaded closure 28. A magnetic coil 31 is then fit over the exterior of cylinder 28 in direct contact with the exterior wall of cylinder 28. A rear half case 32 which is substantially semetrical but oppositely disposed to front half case 30 is then placed over the cylinder 28. The rear half case 32 contains threaded aperatures 33 to receive screws such as 34 which are inserted through aperatures 35 in the front half of case 30 and fastened to threads 33 of rear half case 32 to fasten the case firmly about cylinder 28 and magnetic coil 31. The rear end of cylinder 28 contains a thread 36 for attachment to a beer supply line to provide beer under pressure. Before the tap 1 and the valve 2 are connected, a coil spring 37, plunger 38 and valve seat 39 are placed in cylinder 28. The valve seat 39 has a generally cylindrical exterior shape 40. A groove 41 is cut in the cylindrical exterior shape 40 to receive a resilient seal 42. The groove 41 is located near the back of valve seat 39 where the exterior portion of valve seat 39 seats against the shoulder between the largest diameter of cylinder 28 and the next largest diameter of cylinder 28. The end of the valve seat 39 closest to the valve 2 has a endwall 43 inclining inwardly at approximately 15° from the vertical. Approximately the middle third of the endwall 43 is open 44. Proceeding forwardly from the opening 44 the middle of the valve seat 39 opens outwardly in a generally conical shape 45. The plunger 38 has a generally hollow cylindrical body 46 with a generally hollow conical nose 47. The exterior part of conical nose 47 includes a groove 48 set back slightly from the point of the conical nose 47. The groove 48 is adapted to receive and retain a flexible seal 49 which will sit against the endwall 43 of the valve seat 39 proximate opening 44 when the valve is closed. A series of inclined ports 50 are spaced around the generally conical nose 47 between the groove 48 and point where the conical valve 47 joins the generally hollow cylindrical body 46. The plunger 38 is normally retained against the valve seat 39 by coil spring 37. The coil spring 37 is of substantially the same diameter as the median inner diameter of cylinder 28. One end of coil spring 37 presses against the end of the hollow cylindrical body 46 of plunger 38 while the other end of coil spring 37 rests against the shoulder formed between the middle diameter and smaller diameter near the end of cylinder 28 farthest from tap 1.

The valve 2 includes a switch 51 which through electrical controls which are not part of this invention can control the quantity of beer delivered in predetermined quantities to fill a glass or a pitcher. The switch 51 also activates a light or lights 52 to indicate to the barman the quantity of product to be delivered by the switch 51.

Figure 2:
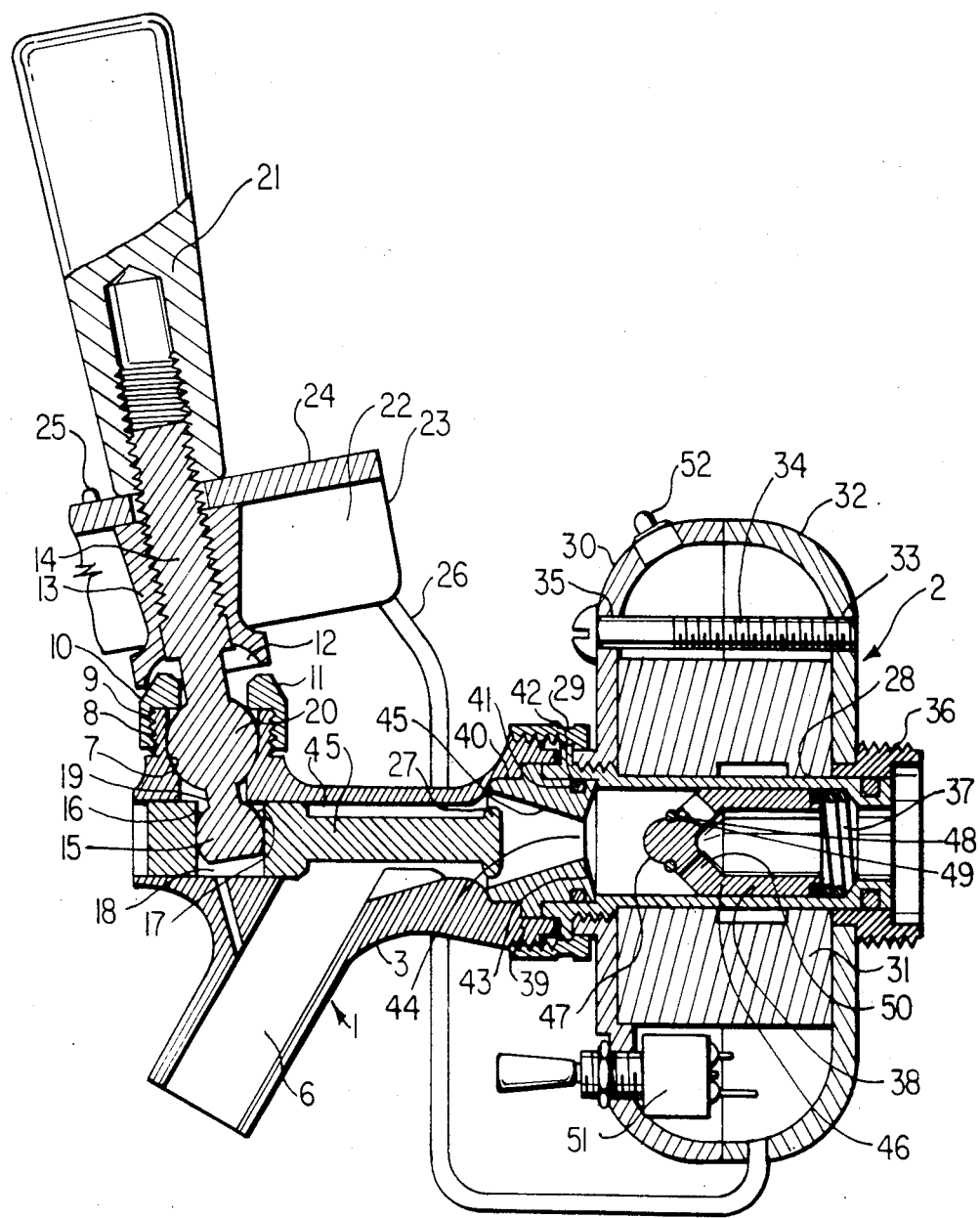
FIG. 2 is a cross-sectional view through the tap and valve showing the valve in an open position.

In operation, as shown in FIG. 2, a pull of the handle 21 activates the mercury or magnetic switch 22 which in turn activates a control box which in turn activates the magnetic coil 31 which causes the plunger 38 to move away from valve seat 39 against the pressure of coil spring 37 and the pressure in the beer lines. The magnetic coil 31 is off centered to control the length of travel of the plunger 38. A length of travel for the plunger of 3/32 of an inch has been effective in controlling surge. As soon as the plunger 38 moves rearwardly the hollow conical nose 47 leaves the valve seat 39 and the beer begins to flow through the series of inclined parts 50 of conical nose 47 through valve seat 39 around the short enlarged head 27 of liquid control stem 5 and out the spout 6 of tap 1. A flow meter, timer, or other means known in the art serve to cut off the current to the magnetic coil 31 causing the plunger 8 to close while the glass or pitcher is removed and open again when sufficient time for removal of the full glass or pitcher and replacement by an empty glass or pitcher has passed.

The dispensing apparatus of the instant invention is easily serviced by a barman. The tap 1 is removed from displacement valve 2 by unthreading threaded closure 29 and removing tap 1. The valve seat 39, plunger 38 and coil spring 37 are then removed from cylinder 28. The cylinder 28 can then be cleaned and the spring 37, plunger 38 and valve seat 39 replaced in cylinder 28 after they in turn have been cleaned. The tap 1 can be disassembled by unthreading ball socket cover 10 and removing handle shaft 14 from liquid control stem 5 which will enable the removal of liquid control 5 from horizontal cylinder 4 of tap 1. Once the parts have been cleaned they may be reassembled by following the reverse order used in disassembly.

The instant dispending apparatus resembles the apparatus used for manual delivery of beer. However, the valve control means actually operates through a mercury or magnetic switch which activates a control box which in turn operates a magnetic coil which drives the plunger against the spring to open the tap. As stated earlier the delivery of liquid may be controlled directly by opening the handle to activate a timed or flow metered automated circuit which will provide continuous automated on/off delivery of liquid until the automated circuit is turned off by moving the handle to the closed position.

While the particular arrangement of the magnetic coil, plunger, valve seat and spring in a cylinder provide a successful displacement valve arrangement, it will be recognized by those in the art that changes may be made in the arrangement of elements or substitutions made to achieve the same function without departing from the scope of this invention.

The embodiments of the invention in which an exclusive property or privilege is claimed are defined as follows:

1. A liquid control valve for an effervescent liquid comprising a valve seat having a central aperture connecting opposing first and second outwardly diverging interior surfaces, a hollow cylindrical body having an internal bore positioned adjacent and adjoining said valve seat, plunger means positioned in the bore of said cylindrical body having a hollow interior and an open rearwardly disposed portion in communication with effervescent liquid supply means, a generally conical front end on said plunger means adapted to seat against said first outwardly diverging interior surface of said valve seat when the valve is closed, a series of inclined ports extending through said conical front end of the plunger means in communication with said internal bore and ending proximate the interior wall of the cylindrical body to permit communication between the interior of the plunger means and the bore of the hollow cylindrical body, means to inhibit the flow of effervescent liquid beyond said central aperture when the valve is in an open position, said means to inhibit the flow of effervescent liquid comprising a liquid control stem slidably mounted in a cylindrical bore of a housing adjoining said valve seat in opposing relation to said second outwardly diverging surfaces, said liquid control stem having opposing ends having a diameter approximately the same as the diameter of the bore of said housing and a middle portion of lesser diameter than the diameter of said bore of said housing, one end of said stem including an enlarged head portion which is displaced toward and limited in extent by said second outwardly diverging interior surface of said valve seat when the valve is in an open position to inhibit the flow of effervescent liquid beyond said central aperture when said valve is in the open position, and means adapted to move said plunger means both away from and toward said valve seat.

2. The liquid control valve of claim 1 in which said second outwardly diverging interior surface of said valve seat is conically shaped.

3. The liquid control valve of claim 1 further including spout means in communication with the cylindrical bore of said housing through which effervescent liquid passes upon flow of same through the valve.

* * * * *